US012010033B2

(12) United States Patent
Furber et al.

(10) Patent No.: US 12,010,033 B2
(45) Date of Patent: Jun. 11, 2024

(54) ON CHIP ROUTER

(71) Applicant: COGNISCIENCE LIMITED, Cheshire (GB)

(72) Inventors: Steve Furber, Cheshire (GB); Gengting Liu, Dongguan (CN)

(73) Assignee: COGNISCIENCE LIMITED, Cheshire (GB)

( * ) Notice: Subject to any disclaimer, the term of this patent is extended or adjusted under 35 U.S.C. 154(b) by 0 days.

(21) Appl. No.: 17/997,085

(22) PCT Filed: Apr. 26, 2021

(86) PCT No.: PCT/GB2021/051009
§ 371 (c)(1),
(2) Date: Oct. 25, 2022

(87) PCT Pub. No.: WO2021/219985
PCT Pub. Date: Nov. 4, 2021

(65) Prior Publication Data
US 2023/0208776 A1    Jun. 29, 2023

(30) Foreign Application Priority Data

Apr. 28, 2020 (GB) ..................................... 2006229

(51) Int. Cl.
*H04L 47/32* (2022.01)
*H04L 47/129* (2022.01)
*H04L 49/90* (2022.01)

(52) U.S. Cl.
CPC ............ *H04L 47/32* (2013.01); *H04L 47/129* (2022.05); *H04L 49/9063* (2013.01)

(58) Field of Classification Search
CPC . H04L 41/0896; H04L 45/00; H04L 12/4633; H04L 41/0816; H04L 49/3063;
(Continued)

(56) References Cited

U.S. PATENT DOCUMENTS 9,374,303 B1 *  6/2016  Ulman ................... H04L 12/18
2002/0039368 A1  4/2002  Musoll et al.
(Continued)

FOREIGN PATENT DOCUMENTS

| CA | 2233555 A1 | 4/1997 |
|---|---|---|
| WO | 92/20177 A1 | 11/1992 |
| WO | 2007034407 A1 | 3/2007 |

OTHER PUBLICATIONS

A Multicast Routing Scheme for a Universal Spiking Neural Network Architecture, Jian Wu and Steve Furber Advanced Processor Technologies Group, School of Computer Science, The University of Manchester, Oxford, The Computer Journal, vol. 53 No. 3, 2010 (Year: 2010).*

(Continued)

*Primary Examiner* — Djenane M Bayard
(74) *Attorney, Agent, or Firm* — Michael Best & Friedrich LLP

(57) ABSTRACT

There is disclosed a router for routing data on a computing chip comprising a plurality of processing elements, the router comprising: a packet processing pipeline; a dropped packet buffer; and one or more circuits configured to: determine that a data packet in the packet processing pipeline is to be dropped; move the data packet that is to be dropped from the packet processing pipeline to the dropped packet buffer; and re-insert the dropped data packet from the dropped packet buffer into the packet processing pipeline for re-processing.

25 Claims, 10 Drawing Sheets

(58) Field of Classification Search
CPC ........... H04L 2101/622; H04L 41/0853; H04L 41/0893; H04L 41/0894; H04L 41/0895; H04L 41/122; H04L 45/02; H04L 45/036; H04L 45/586; H04L 45/76; H04L 47/783; H04L 49/00; H04L 49/1546; H04L 49/70; H04L 61/5007; H04L 69/22; H04L 69/04; H04L 65/1101; H04L 65/65; H04L 45/22; H04L 49/90; H04L 63/0861; H04L 63/102; H04L 45/74; H04L 47/12; H04L 47/32; H04L 49/25; H04L 63/0236; H04L 41/0897; H04L 45/64; H04L 47/00; H04L 47/2441; H04L 63/0272; H04L 63/0807; H04L 63/083; H04L 69/329; H04L 9/40; H04L 47/10; H04L 47/11; H04L 47/6215; H04L 63/162; H04L 12/66; H04L 45/38; H04L 63/1408; H04L 69/16; H04L 41/00; H04L 45/306; H04L 47/2483; H04L 47/365; H04L 45/48; H04L 61/00; H04L 65/1069; H04L 65/80; H04L 69/18; H04L 1/1671; H04L 69/32; H04L 1/0002; H04L 1/0003; H04L 1/0025; H04L 1/0032; H04L 1/1685; H04L 27/12; H04L 27/156; H04L 27/14; H04L 65/103; H04L 65/104; H04L 65/1083; H04L 65/1095; H04L 45/16; H04L 47/2416; H04L 49/352; H04L 47/125; H04L 45/245; H04L 47/2458; H04L 49/506; H04L 45/742; H04L 47/2408; H04L 49/102; H04L 49/109; H04L 49/351; H04L 49/3009; H04L 49/602; H04L 47/30; H04L 49/3036; H04L 47/34; H04L 12/1881; H04L 49/15; H04L 49/3072; H04L 45/123; H04L 47/266; H04L 49/3018; H04L 49/354; H04L 49/508; H04L 63/0263; H04L 1/1887; H04L 12/56; H04L 47/50; H04L 49/103; H04L 49/9063; H04L 65/612; H04L 12/5601; H04L 49/901; H04L 49/9047; H04L 67/10; H04L 69/161; H04L 12/18

See application file for complete search history.

(56) References Cited

U.S. PATENT DOCUMENTS

| | | | |
|---|---|---|---|
| 2003/0120991 A1* | 6/2003 | Calle | H04L 1/201 |
| | | | 714/776 |
| 2003/0172181 A1 | 9/2003 | Sharma | |
| 2013/0077632 A1* | 3/2013 | Ishiguro | H04L 65/765 |
| | | | 370/394 |
| 2015/0085667 A1* | 3/2015 | Sivanesan | H04W 72/0453 |
| | | | 370/237 |
| 2016/0261512 A1* | 9/2016 | Lautenschlaeger | H04L 47/283 |
| 2017/0012855 A1* | 1/2017 | Kanayama | H04L 41/0813 |
| 2018/0287964 A1* | 10/2018 | Gray | H04L 49/109 |

OTHER PUBLICATIONS

International Search Report and Written Opinion for Application No. PCT/GB2021/051009 dated Jul. 27, 2021 (11 pages).

Wu et al., "A Multicast Routing Scheme for a Universal Spiking Neural Network Architecture," The Computer Journal, 2010, 53(3), pp. 280-288.

Duato et al., "Deadlock-Free Dynamic Reconfiguration Schemes for Increased Network Dependability," IEEE Transactions on Parallel and Distributed Systems, 2003, 14(8), pp. 780-794.

International Preliminary Report on Patentability for Application No. PCT/GB2021/051009 dated Oct. 27, 2022 (8 pages).

Great Britain Intellectual Property Office Action for Related Application No. GB2006229.5 dated Sep. 25, 2020 (4 pages).

* cited by examiner

ON CHIP ROUTER

CROSS-REFERENCE TO RELATED APPLICATION(S)

This application is a national phase entry of PCT/GB2021/051009, filed on Apr. 26, 2021, which claims priority to GB 2006229.5, filed on Apr. 28, 2020, the entire contents of each of which are fully incorporated herein by reference.

TECHNICAL FIELD

This specification relates to a router for routing data on a computing chip comprising a plurality of processing elements and corresponding methods for processing data packets by the router.

BACKGROUND

Many of today's more powerful computers, including high-performance computers used for demanding scientific applications such as weather forecasting, drug discovery, neural simulations and self-driving vehicles amongst others, use a large number of processors connected together through some kind of inter-processor network. It is vital for these machines that their communications networks do not deadlock as a result of circular dependencies between packets of information travelling through the networks. A deadlock is a situation where packet A cannot proceed because its path is blocked by packet B, and packet B cannot proceed because its path is blocked by packet A. More than two packets may be involved in such a circular dependency, but the principle remains the same.

To avoid any risk of circular dependencies resulting in deadlocks, it is common practice to design such networks such that circular dependencies can never arise. This can be achieved through the use of multiple network layers, or the use of virtual channels, or other known techniques. Such techniques are effective in eliminating any possibility of a circular dependency, but they incur significant additional cost in terms of the hardware required to support the additional communication features. As such, it is desirable to provide improved means of preventing deadlock in inter-processor networks.

SUMMARY

According to a first aspect, there is provided a router for routing data on a computing chip comprising a plurality of processing elements, the router comprising: a packet processing pipeline; a dropped packet buffer; and one or more circuits configured to: determine that a data packet in the packet processing pipeline is to be dropped; move the data packet that is to be dropped from the packet processing pipeline to the dropped packet buffer; and re-insert the dropped data packet from the dropped packet buffer into the packet processing pipeline for re-processing.

As discussed above, prior methods attempted to design inter-processor networks such that circular dependencies that can result in deadlock can never arise. However, such techniques incur significant additional cost in terms of the hardware required to support the additional communication features required. The present invention allows a much simpler network to be deadlock free by allowing packets that may be blocked to be temporarily removed ("dropped") from the network fabric and held in a buffer, thereby removing any circular dependencies. The packets can subsequently be re-inserted into the network and delivered as normal. The use of hardware mechanisms for packet dropping and re-insertion allows the network to maintain good throughput even when congested, thereby ensuring rapid and reliable packet delivery from a low-cost network fabric.

In some other prior art methods, the process for dropping data packets is performed in software. For example, in one prior art method, a processing element on the chip is designated as a monitor processor. When it is determined that a packet is to be dropped, an interrupt signal is sent to the monitor processor. The monitor processor may then copy the dropped packet and re-transmit the copied packet. This process however is slow given the time required for the monitor processor to service the interrupt. The latency incurred to copy and re-transmit the packet over the network further increases the time required to handle dropped packets. The present invention provides a hardware-based packet dropping and reinsertion mechanism as part of the router. Thus, the time required to process dropped packets is significantly reduced and the throughput of the router under congestion can be increased. As packet dropping and re-insertion happens fully within the router instead of requiring transmission of the dropped packet to a monitor processor and re-transmission to the router, the process is also more power efficient. In addition, as a monitor processor is not required, the processing elements of the chip can be fully dedicated to performing their respective tasks.

It will be appreciated that the router may route data packets between processing elements of the same chip and that chips may be connected such that data packets may be routed between processing elements of different chips. It will also be appreciated that the router comprises a hardware-based packet dropping and re-insertion mechanism comprising the dropped packet buffer and the one or more circuits.

The one or more circuits may comprise a packet re-insertion module that includes the dropped packet buffer and is configured to re-insert the dropped data packet from the dropped packet buffer into the packet processing pipeline for re-processing.

The one or more circuits may be configured to determine that a data packet in the packet processing pipeline is to be dropped based upon a signal indicating that a destination of the data packet is unable to receive the data packet. It will be appreciated that a destination may not necessarily be a final destination of the data packet, rather a destination may include an intermediate node of the on-chip data network or may be an output port of the router. In order to avoid blocking the packet processing pipeline, the data packet may be dropped.

The packet processing pipeline may further comprise an out-of-order packet buffer and the one or more circuits may be configured to move the data packet that is to be dropped from the out-of-order packet buffer to the dropped packet buffer. The one or more circuits may be further configured to select a data packet for processing by the packet processing pipeline; determine one or more destinations of the data packet; determine that a destination of the one or more destinations of the data packet is unable to receive the data packet; and move the data packet to the out-of-order packet buffer.

The out-of-order packet buffer may enable stalled data packets, that is, data packets that cannot yet be transmitted, to be queued such that the packet processing pipeline can continue to process further packets without needing to wait for a stalled data packet to be dropped before continuing.

Where a data packet cannot be transmitted, it may be stored in the out-of-order packet buffer until such time as the data packet may be transmitted out to its destinations or should be removed from the out-of-order buffer to be dropped.

The out-of-order packet buffer may be a pipeline queue. When new data packets become stalled, existing stalled data packets in the out-of-order packet buffer may be moved further along in the queue to accommodate the new stalled at packets. The data packet that is to be dropped may be oldest data packet in the out-of-order packet buffer.

The one or more circuits may be configured to determine that a data packet in the packet processing pipeline is to be dropped based upon the expiration of a timer. For example, where an out-of-order packet buffer is used, the timer may be started when a data packet reaches the end slot of the buffer. This may indicate that the buffer is full and that data packets will be to be dropped to ensure that packet processing pipeline is not unduly delayed. Where an out-of-order packet buffer is not used, a timer may be started when it is determined that the data packet cannot be transmitted. The timer provides a minimum waiting time such that packets are not unnecessarily dropped.

The one or more circuits may be configured to re-insert the dropped data packet from the dropped packet buffer into the packet processing pipeline for re-processing based upon a timer. For example, the timer may start when a packet is moved into the dropped packet buffer and the dropped packet buffer is no longer empty. The timer may be reset when a dropped packet is removed from the dropped packet buffer and re-inserted into the packet processing pipeline. The timer may be restarted if the dropped packet buffer is not empty. The timer thereby enforces a minimum time interval between dropped packet re-insertions. The minimum time interval may be configured dynamically based upon a current load of the dropped packet buffer and/or the current status of the router and/or the current status of the on-chip network.

The one or more circuits may be configured to re-insert the dropped data packet from the dropped packet buffer into the packet processing pipeline for re-processing based upon a load of the packet processing pipeline. For example, a re-insertion request may be sent to the packet processing pipeline and a re-insertion is performed when the request is granted. Granting of the request may be based upon the load of the packet processing pipeline and/or when there is a free slot at the start of the pipeline and/or when there are no new data packets arriving for processing and/or on a periodic or interleaved basis with newly arriving data packets and/or other conditions deemed appropriate by a person skilled in the art. The one or more circuits may comprise a re-insertion requester as part of a packet re-insertion module for handling the re-insertion request and the re-insertion requester may be connected to a re-insertion timer that signals when to generate a re-insertion request.

The router may be configured to provide a software-based packet offload operation to remove a data packet stored in the dropped packet buffer for re-processing of the data packet outside of the router. For example, if the dropped packet buffer is full or approaching full, a software-based mechanism may be used to remove packets from the dropped packet buffer for storage elsewhere on chip such as local memory associated with a processing element. The removed packet may then be re-transmitted on the on-chip network. The router may comprise a register in a general register file that when read from, initiates the software-based packet offload operation. The general register file may be configured as an intermediate storage location for storing the dropped packet prior to copying the packet out of the router to elsewhere on-chip.

The packet processing pipeline may be configured to process multi-cast data packets. The router may comprise a plurality of packet processing pipelines. Each packet processing pipeline may be configured to process a particular type of data packet, for example, a multi-cast packet or system type packet. The dropped packet buffer may be configured to serve all of the packet processing pipelines. The one or more circuits may comprise an arbiter to select between dropped packet requests of different packet processing pipelines. Alternatively, there may be a plurality of dropped packet buffers each serving one or more of the plurality of packet processing pipelines.

The dropped packet buffer may be configured to store a plurality of dropped data packets. The dropped packet buffer may comprise one or more Static RAM (SRAM) modules. The dropped packet buffer may further comprise a packet disassembly buffer for copying a dropped packet into the dropped packet buffer and a packet re-assembly buffer for removing a dropped packet from the dropped packet buffer.

The computing chip may be a neuromorphic chip. Neuromorphic chips are specialised chips for performing biological neural simulations. In a biological neural network, processing is achieved via the firing of electro-chemical impulses between neurons of the biological neural network. Information is contained in the firing rate and timing of these impulses. This may be simulated using one or more neuromorphic chips whereby the processing elements of the neuromorphic chips are configured to simulate the activities of individual neurons. Data packets representing the impulses are sent between neurons (processing elements) at the appropriate time and rate. Thus, given the potential large-scale nature of the simulation and the desire for the simulation to occur in biological real-time, effective management of data traffic on and between chips is critical.

In addition, data packets representing neural communication may be sent as multi-cast packets given the one to many nature of neural connectivity. In order to simplify delivery of multi-cast packets, an all-or-nothing policy may be used such that a packet must be deliverable to all destinations or it is not transmitted at all. Such a policy may result in additional waiting time before a data packet can be transmitted. In addition, multi-casting packets may require creating multiple copies of the same packet which may also create a delay within the router and may also impact on router throughput.

Furthermore, the components on the neuromorphic chip may operate at different speeds and there may need to be restrictions in place on the transmission rate from the router to various components in order to avoid overwhelming those components. For example, a processing element may not be able to process packets as quickly as the router may be able to transmit the packets. As such, there may be restrictions on how quickly data packets can be transmitted out of the router to the same processing element. In another example, neuromorphic chips may be connected together to increase the processing power available. Packets may be transmitted to processing elements of different chips through an inter-chip link. The inter-chip link may run slower than the router and as such, there may be restrictions on the transmission of packets out of the router via the inter-chip link further affecting router throughput.

Network congestion and the inability to maintain sufficient router throughput can also result in significant performance decrease on the on-chip network. For example, congestion at a particular node may prevent packets from being transmitted out of the router and may cause the packet processing pipeline to halt. This may in turn cause further congestion as packets are queued up at nodes in the network to the point where no further packets can be transmitted given that blocked nodes may be dependent on other blocked nodes for routing and a deadlock situation may arise. Congestion at a node may arise if the node is unable to process packets as quickly as they are being received or if the node has crashed. In another example, network congestion may delay the timely transmittal of system/configuration type packets and may cause the system to slow or even crash.

The present invention is particularly suitable for use with neuromorphic chips given the provision of hardware mechanisms for packet dropping and re-insertion, which as noted above, is capable of maintaining good throughput even in the presence of network congestion. It will be appreciated that the above discussion may also be applicable more generally to computing chips such as those used in high performance computing applications (HPC).

According to another aspect, there is provided a method of routing data on a computing chip comprising a plurality of processing elements, the router comprising a packet processing pipeline, a dropped packet buffer, and one or more circuits, the method comprising: determining, by the one or circuits, that a data packet in the packet processing pipeline is to be dropped; moving, by the one or more circuits, the data packet that is to be dropped from the packet processing pipeline to the dropped packet buffer; and re-inserting, by the one or more circuits, the dropped data packet from the dropped packet buffer into the packet processing pipeline for re-processing.

The method may correspond to the operations of the one or more circuits of the first aspect. For example, determining that a data packet in the packet processing pipeline is to be dropped may be based upon a signal indicating that a destination of the data packet is unable to receive the data packet.

The method may further comprise moving the data packet that is to be dropped from an out-of-order packet buffer to the dropped packet buffer.

The method may further comprise: selecting a data packet for processing by the packet processing pipeline; determining one or more destinations of the data packet; determining that a destination of the one or more destinations of the data packet is unable to receive the data packet; and moving the data packet to the out-of-order packet buffer.

The data packet that is to be dropped may be the oldest data packet in the out-of-order packet buffer.

Determining that a data packet in the packet processing pipeline is to be dropped may be based upon the expiration of a timer.

Re-inserting the dropped data packet from the dropped packet buffer into the packet processing pipeline for re-processing may be based upon a load of the packet processing pipeline.

The method may further comprise removing a data packet stored in the dropped packet buffer in response to a software-based packet offload operation.

The packet processing pipeline may be configured to process multi-cast data packets.

The dropped packet buffer may be configured to store a plurality of dropped data packets.

The dropped packet buffer may comprise one or more SRAM modules.

The computing chip may be a neuromorphic chip.

It will be appreciated that aspects can be combined and it will be readily appreciated that features described in the context of one aspect can be combined with other aspects.

BRIEF DESCRIPTION OF THE FIGURES

Embodiments will now be described, by way of example, with reference to the accompanying drawings, in which.

DETAILED DESCRIPTION

Figure 1:
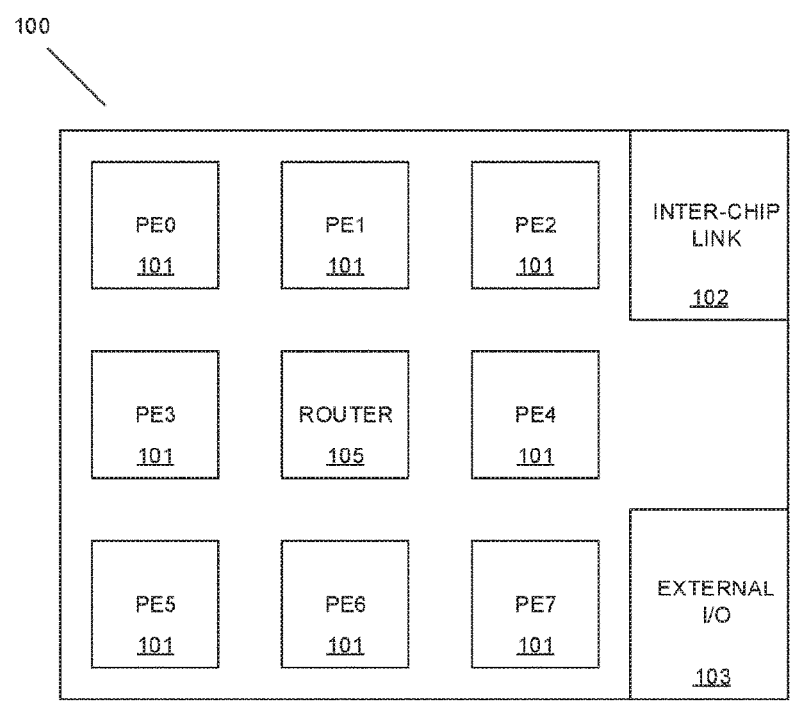
FIG. 1 is a schematic illustration of a neuromorphic chip.

Referring now to FIG. 1, a schematic illustration of a neuromorphic chip 100 is shown. The neuromorphic chip 100 comprises a plurality of processing elements 101. Whilst FIG. 1 shows a chip having eight processing elements, it will be appreciated that there may be a greater (or fewer) number of processing elements on the chip 100. For example, one exemplary neuromorphic chip has 152 processing elements.

Each processing element may comprise a processor core, local memory and modules for transmitting and receiving data. Data may be communicated between processing elements 101 of the chip 100 and/or between processing elements of different chips. The chip 100 may comprise a plurality of inter-chip links 102 in this regard. External devices may also be connected to the chip 100 via the external I/O interface 103.

The chip 100 additionally comprises a primary router 105. The primary router 105 is configured to direct specified types of on-chip data traffic, such as multi-cast data packets, and all inter-chip data traffic. Data is communicated via communication links on the chip 100 that connect the different components of the chip 100 and forms a Network-on-Chip (NoC). Where data is to be communicated to a component on another chip, the primary router 105 may be in communication with the primary router of the other chip via the inter-chip links 102.

The primary router 105 comprises a packet processing pipeline. The packet processing pipeline is configured to receive data packets transmitted to the primary router 105 for processing, determine a destination of the data packet, determine an appropriate routing path for the data packet, and to transmit the data packet to the determined destination via the determined routing path.

When a data packet is ready to be transmitted out of the pipeline to its destination, it is possible that the data packet cannot be transmitted at that time due factors such as network congestion. For example, the neuromorphic chip 100 may be used to run a neural simulation. Each processing element of the chip 100 may be used to simulate a large number of neurons, for example, one processing element may simulate 1000 neurons. Thus, there may be congestion at the router 105 if communications are directed to a large number of neurons on the same processing element or if large amounts of communications are destined for a small number of neurons on the processing element. In addition, one neuron is typically connected to many other neurons. This is reflected in the use of multi-casting for communications between neurons, that is, one data packet transmitted from a processing element to the router 105 may result in the generation of many data packets being transmitted out of the router 105, thereby amplifying network traffic. Furthermore, in order to simplify the delivery mechanism of multi-cast packets, the router may operate an all-or-nothing policy, whereby a multi-cast packet is only transmitted out of the router 105 if all of the destinations are available to receive the multi-cast packet. This policy avoids the need for mechanisms to record delivery of multi-cast packets and to formulate potentially complex re-transmission policies, thereby reducing storage and power requirements of the chip. However, an all-or-nothing policy increases the likelihood that a packet cannot be transmitted and therefore stalling at the end of the packet processing pipeline. This may cause the packet processing pipeline to become blocked until the stalled packet may be transmitted.

The router 105 provides a hardware-based mechanism for handling stalled packets and to maintain throughput of the router 105. In this regard, the router 105 further comprises a dropped packet buffer and one or more circuits within the router 105 configured to determine that a data packet in the packet processing pipeline is to be dropped. The one or more circuits are further configured to move the data packet that is to be dropped from the packet processing pipeline to the dropped packet buffer. The one or more circuits are additionally configured to re-insert the dropped data packet from the dropped packet buffer into the packet processing pipeline for re-processing. Each of these operations are described in more detail below with reference to FIG. 3 which shows an exemplary packet processing pipeline that includes a dropped packet buffer 306.

In some prior art methods, the process for handling stalled packets is performed in software. For example, in one prior art method, a processing element on the chip 100 is designated as a monitor processor. When a packet is to be dropped, an interrupt signal is sent to the monitor processor. The monitor processor may then copy the dropped packet and re-transmit the copied packet. This process however is slow given the time required for the monitor processor to service the interrupt. The latency incurred to copy and re-transmit the packet over the network further increases the time required to handle dropped packets. By providing a hardware-based packet dropping and reinsertion mechanism as part of the router 105, the time required to process dropped packets is significantly reduced and the throughput of the router 105 under congestion can be increased. As packet dropping and re-insertion happens fully within the router 105 instead of requiring transmission of the dropped packet to a monitor processor and re-transmission to the router, the process is also more power efficient. In addition, as a monitor processor is not required, the processing elements of the chip can be fully dedicated to performing their respective tasks. An analysis of the throughput of the router 105 is provided in more detail below.

Figure 2:
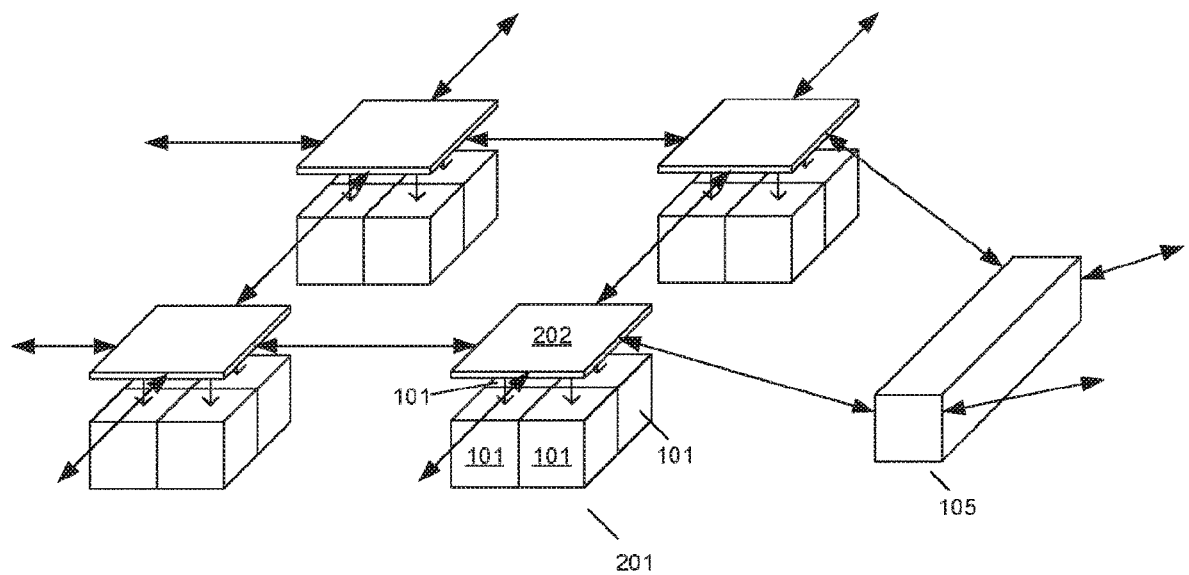
FIG. 2 is a schematic illustration of a network topography on a neuromorphic chip.

Referring now to FIG. 2, a schematic illustration of an exemplary network topology for the NoC is shown. In FIG. 2, the NoC is arranged as a 2D mesh network. This type of topology provides a more scalable solution as the number of processing elements on the chip increases compared to other network topologies such as a star topology.

Processing elements on the chip are arranged into groups of four as Quad Processing Elements (QPE) 201. Each QPE is associated with a Network-on-Chip (NoC) router 202 configured to direct traffic for the corresponding processing elements 101 of the QPE 201 and to forward data packets onto an appropriate neighbouring NoC router 202 in the mesh network. Routing of data packets is however controlled by the primary router 105. Thus, all data packets transmitted from a processing element are transmitted to the primary router 105, possibly via several NoC routers 202, and then the primary router 105 determines one or more destinations of the data packet and the most appropriate path to the one or more destinations.

It will be appreciated that other arrangements of processing elements and network topologies may be used as deemed appropriate by a person skilled in the art. It will also be appreciated that FIG. 2 shows a partial view of the NoC with components omitted for clarity.

Figure 3:
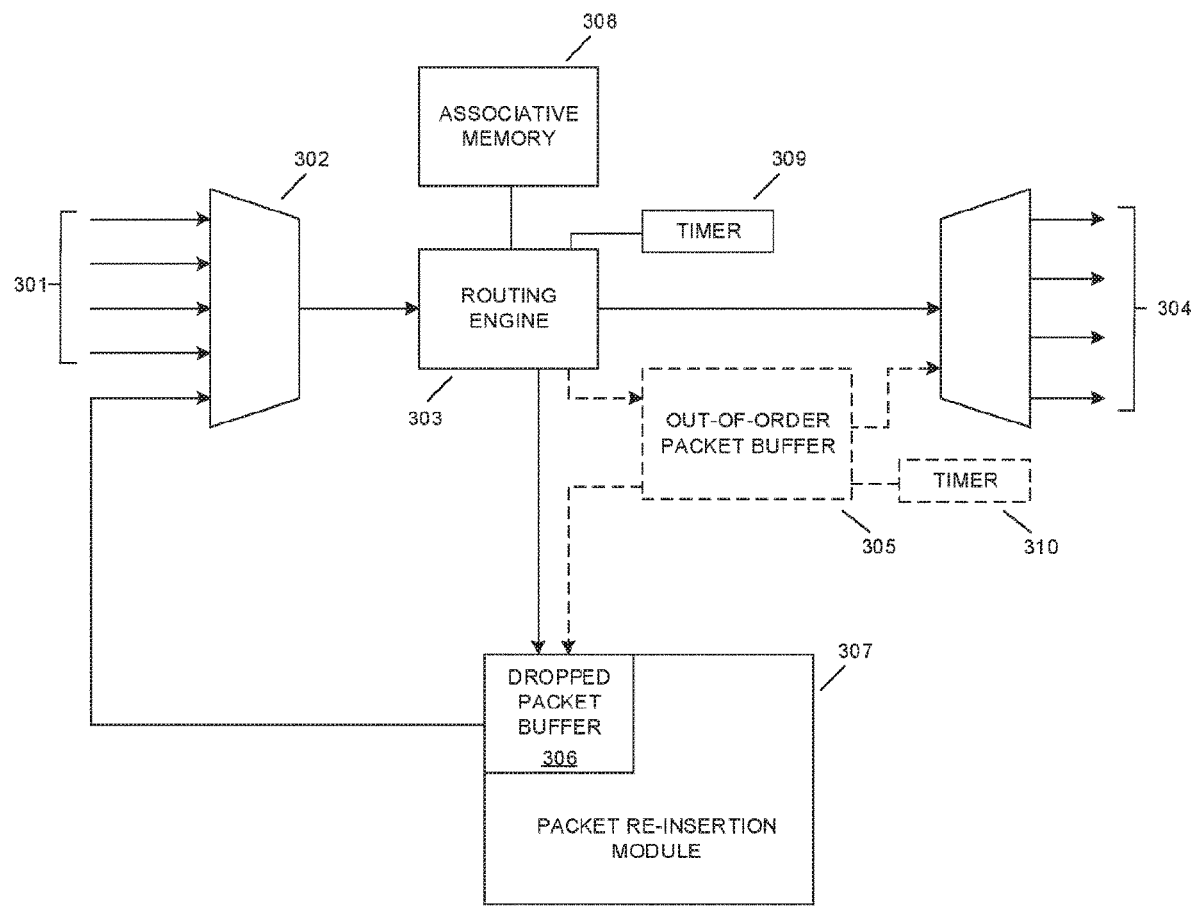
FIG. 3 is a schematic illustration of a packet processing pipeline of a router on a neuromorphic chip.

The operations of the router 105 will now be described in further detail. FIG. 3 is a schematic illustration of data packet flow through the router 105. Whilst FIG. 3 shows one packet processing pipeline, it will be appreciated the router 105 may comprise a plurality of packet processing pipelines. In particular, each packet processing pipeline may be responsible for handling a particular type of data packet, for example, a multi-cast packet or system type packet.

Referring back to FIG. 3, data packets for processing by the router 105 may be received through parallel data streams 301. As the router 105 is configured to handle data packets for all processing elements 101, the router 105 may comprise a plurality of input ports, each input port configured to service a particular region of the chip 100 or one or more of the inter-chip links 102. Each input port may therefore be configured to provide an input data packet stream to the router 105.

An arbiter 302 is configured to select a data packet from the input data streams 301 to process. For example, the arbiter 302 may be configured to perform the selection on a round-robin basis, selecting a data packet from each input data stream 301 in turn. It will be appreciated however that an alternative selection may be used as deemed appropriate by a person skilled in the art.

A routing engine 303 is configured to process the selected data packet to determine one or more destinations of the data packet and an appropriate routing path through the NoC to the one or more destinations. The one or more destinations may be determined based upon information contained in the data packet. For example, multi-cast data packets may be source routed. That is, the data packet may comprise an identifier of the sender of the data packet, such as a neuron identifier. The router 105 may further comprise an associative memory 308 configured to map neuron identifiers according to the connectivity of neurons in the neural simulation being run. The routing engine 303 may access the associative memory 308 based upon the neuron identifier to determine the outgoing connections of the corresponding neuron and which processing elements 101 and which neurons the data packet is intended for. Alternatively, data packets may comprise information indicating the destination of the data packet. For example, system/configuration type data packets may use destination routing whilst application (neural simulation) type data packets may use source routing. It will be appreciated that whilst FIG. 3 shows the associative memory 308 as being separate to the routing engine 303, the associative memory 308 may be a part of the routing engine 303.

Upon completion of processing of the data packet by the routing engine 303, the data packet may be transmitted to the determined one or more destinations. The router 105 may further comprise a plurality of output ports 304 for transmitting the data packet. Similar to the plurality of input ports, each output port may be configured to service a particular region of the chip 100 or one or more inter-chip link 102. However, as discussed above, it is possible that the data packet cannot be transmitted at the current time. For example, if a destination of the data packet is not currently able to receive the data packet. It will be appreciated that a destination may not necessarily be a final destination of the data packet, rather a destination may include any point along the transmission path of the data packet starting from the end of the packet processing pipeline. For example, transmission of the data packet out of the router 105 may be via a particular output port 304. It is possible that the particular output port 304 is unavailable and as such, the data packet cannot be transmitted at the current time. In another example, an intermediate node of the network such as a NoC router 202 may be unavailable and thereby preventing the data packet from being transmitted. To avoid blocking the packet processing pipeline, a data packet that cannot be transmitted may be dropped.

The data packet may be dropped based upon a signal indicating that a destination of the data packet is unable to receive the data packet. For example, an output port 304 of the router 105 may provide a signal indicating that it is not currently available for processing a data packet. Likewise, other nodes on the NoC may provide signals indicating their availability.

Rather than immediately dropping a data packet, the one or more circuits of the router 105, such as the routing engine 303, may be configured to wait a specified period of time before determining that the data packet is to be dropped. If during this waiting period, the blocked destination(s) become available, the data packet may be transmitted as normal without being dropped. Otherwise, if the waiting period expires without the blocked destination(s) becoming available, the data packet may be dropped.

The waiting period may be implemented using a timer 309. The waiting period may be set based upon the type of data packet, with different types of data packets having different waiting times. The waiting period may also be dynamically configurable based upon the current status of the router 105 and the NoC.

The router 105 may also comprise an out-of-order packet buffer 305 to enable stalled data packets to be queued such that the packet processing pipeline can continue to process further packets without needing to wait for a stalled data packet to be dropped before continuing. In this case, where a data packet cannot be transmitted, it may be moved to the out-of-order packet buffer 305 until such time as the data packet may be transmitted out to its destinations or should be removed from the out-of-order buffer 305 to be dropped.

For example, the out-of-order packet buffer 305 may be implemented as a pipelined queue. That is, a new stalled data packet may be inserted at the start of the queue, pushing the existing stalled data packets in the out-of-order packet buffer 305 along to the next slot in the queue towards the end of the queue. If at any point the destinations preventing a particular packet from being transmitted become available, the packet may be removed from the out-of-order packet buffer 305 and transmitted to its destinations via the relevant output ports 304. Thus, in this respect, data packets may be transmitted out-of-order compared to the order of processing by packet processing pipeline. Should destinations for multiple packets become available for transmittal simultaneously, the oldest data packet, i.e. the data packet furthest towards the end of the queue may be selected for transmission and removal from the out-of-order packet buffer 305.

When a stalled data packet reaches the end slot of the out-of-order packet buffer 305, a timer 310 may be triggered. If the stalled data packet remains in the end slot of the out-of-order packet buffer 305 upon the expiration of the timer 310, that is, if the stalled data packet still cannot be transmitted out, it may be determined that the stalled data packet in the end slot is to be dropped.

The out-of-order packet buffer 305 may be configured such that a new stalled data packet can only be inserted into the out-of-order packet buffer 305 when the entry slot into the out-of-order packet buffer 305 is available. A new stalled data packet may cause a signal configured to push existing packets in the out-of-order packet buffer 305 forward to create space for the new stalled data packet. If the out-of-order packet buffer 305 is full then this may not be possible and the new stalled data packet must wait at the output of the routing engine 303 which may cause the packet processing pipeline to temporarily halt.

In an alternative example, the out-of-order packet buffer 305 may comprise a plurality of unordered slots. A new stalled packet may be stored in an available slot which triggers a timer associated with that particular slot. If the stalled packet cannot be transmitted when the timer expires, it may be determined that the stalled packed is to be dropped. Thus, in this example, the slots in the out-of-order packet buffer 305 are not linked. However, in the previous example, stalled packets may be afforded a longer period of time in which they may still be transmitted before becoming dropped as stalled packets are only dropped when a stalled packet is pushed to the end slot of the out-of-order packet buffer 305 which starts the timeout. How quickly a stalled packet becomes dropped may depend on the rate at which processed data packets become stalled.

When it is determined that a data packet is to be dropped, the one or more circuits of the router 105 are configured to move the data packet from the packet processing pipeline (for example, from the output of the routing engine 303 or, if in use, the out-of-order packet buffer 305) to a dropped packet buffer 306. The dropped packet buffer 306 may be part of a packet re-insertion module 307 of the router 105. Dropped packets can then be re-inserted into the packet processing pipeline from the dropped packet buffer 306.

It will be appreciated that where there exists a plurality of packet processing pipelines, the dropped packet buffer 306 may serve all of the packet processing pipelines. For example, an arbiter may be configured to select one dropped packet request from the plurality of packet processing pipelines for handling by the packet re-insertion module 307 if more than one dropped packet requests are pending. The selection of a dropped packet request to process may follow any arbitration scheme as deemed appropriate by a person skilled in the art. For example, a round-robin scheme may be used, or dropped packet requests may be prioritised in order of arrival or prioritised depending on the status of the individual packet processing pipelines. As an alternative to a single dropped packet buffer 306, there may be a plurality of dropped packet buffers 306 each serving one or more of the plurality of packet processing pipelines.

As briefly mentioned above, each of the packet processing pipelines may be configured to process a different type of data packet and each packet processing pipeline may have its own routing engine configured to handle particular packet types in a particular way. For example, as discussed above, packets that represent neural communication in a neural simulation may be multi-casted and source routed. A packet processing pipeline and routing engine may be devoted to processing multi-cast packets.

Another packet processing pipeline and routing engine may be configured to process "core-to-core" type packets. This type of packet provides communication between processing elements primarily for system management and control purposes and may be destination routed. A further packet processing pipeline and routing engine may be configured to process "nearest-neighbour" type packets. This type of packet is intended for system initialisation and debugging purposes and provides communication between monitor processors of neighbouring chips.

Figure 3A:
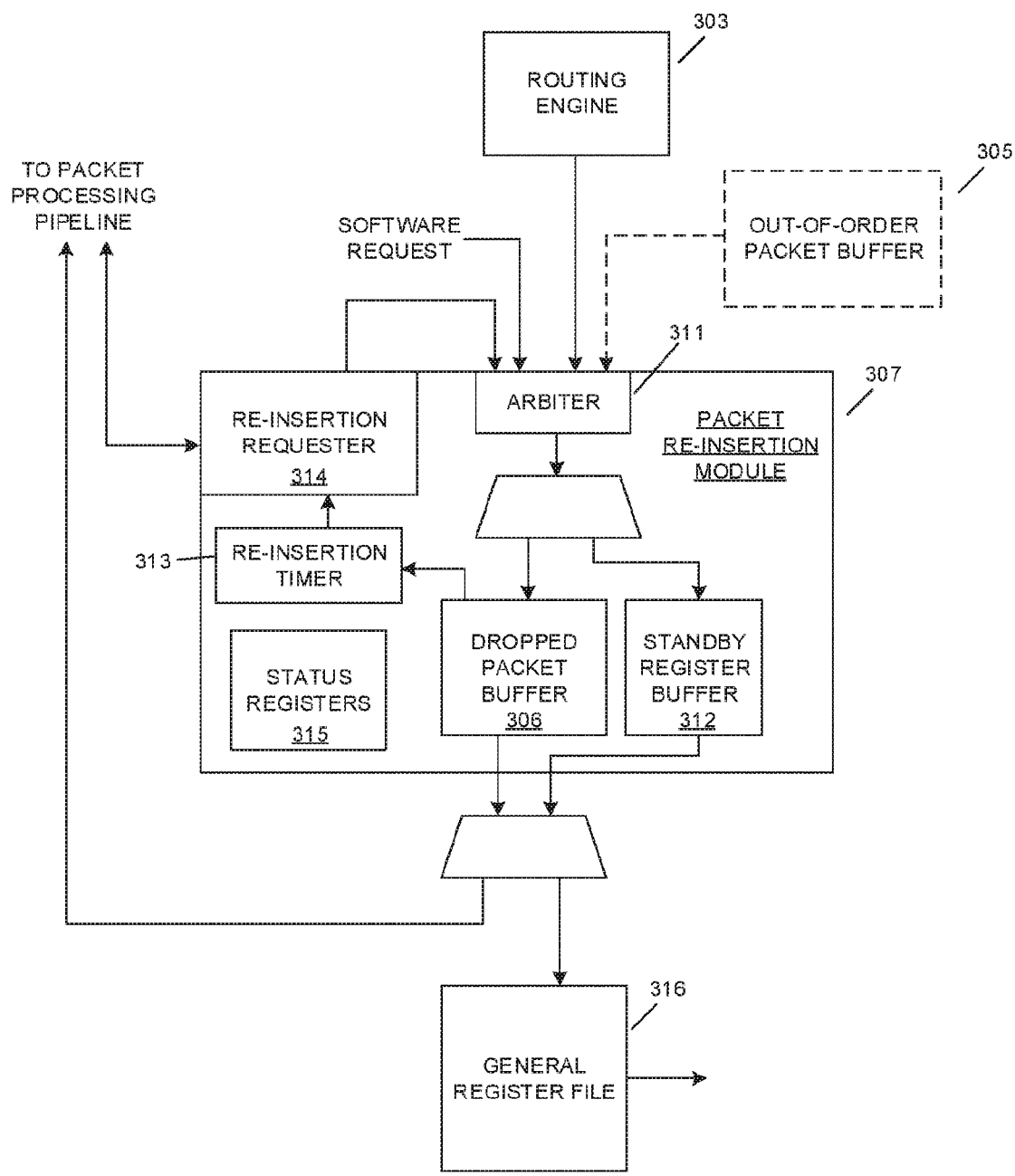
FIG. 3A is a schematic illustration of a packet re-insertion module.

Referring now to FIG. 3A, an exemplary packet re-insertion module 307 is shown in more detail. The packet re-insertion module 307 may be configured to process dropped packet storage requests, either from the routing engine 303 or the out-of-order packet buffer 305 if in use, dropped packet re-insertion requests or software-based packet offload requests. The router 105 may be configured to provide a software-based packet offload operation to remove a data packet stored in the dropped packet buffer for re-processing of the data packet outside of the router. For example, if the dropped packet buffer is full or approaching full, a software-based mechanism may be used to remove packets from the dropped packet buffer for storage elsewhere on chip. This is described in more detail below. Referring back to FIG. 3A, it will be appreciated that the packet re-insertion module 307 may also handle other types of request that are not listed above.

An arbiter 311 may be configured to select one of the requests to process if there are multiple pending requests. In one example, the selection is prioritised in order of dropped packet storage request, software-based offload request and lastly dropped packet re-insertion request. Alternatively, a different arbitration scheme may be used as deemed appropriate by a person skilled in the art.

When a dropped packet storage request is selected for processing, a packet that is to be dropped may be copied to the dropped packet buffer 306 as described above. In addition, the packet re-insertion module 307 may comprise a standby register buffer 312. The packet re-insertion module 307 may be configured to store dropped packets in the standby register buffer 312 if a fault develops within the dropped packet buffer 306. The standby register buffer 312 may be configured to store a single dropped packet. The packet re-insertion module 307 may be configured to prevent overwriting the dropped packet stored in the standby register buffer 312 before the dropped packet is processed. The dropped packet in the standby register buffer 312 may be processed using a software-based mechanism. For example, an interrupt may be sent to a monitor processor which may then transfer the dropped packet from the standby register buffer 312 to another memory location for re-transmission. This process is similar to software-based packet offloading which is described in more detail below.

The re-insertion of dropped packets stored in the dropped packet buffer 306 into the packet processing pipeline may be based upon a timer. For example, when a packet is stored in the dropped packet buffer 306 causing the dropped packet buffer 306 to become non-empty, a re-insertion timer 313 may be started. Upon expiry of the re-insertion timer 313, a request signal from a re-insertion requester 314 may be sent to the packet processing pipeline to request allowance of a packet re-insertion. When the pipeline is able to handle a packet re-insertion, the request may be granted. For example, a re-insertion request may be granted when there is a free slot at the start of the pipeline and/or when there are no new data packets arriving from the input data streams 301 and/or on a periodic or interleaved basis with newly arriving data packets and/or other conditions deemed appropriate by a person skilled in the art.

When the re-insertion request is granted, a dropped packet in the dropped packet buffer 306 may be re-inserted into the packet processing pipeline and removed from the dropped packet buffer 306. In one example, the re-insertion requester 314 may be configured to receive a signal indicating the allowance of the re-insertion request and in turn transmit a request to the arbiter 311 for the packet re-insertion module 307 to perform a packet re-insertion. When the request is selected by the arbiter 311 for processing, a dropped packet may be removed from the dropped packet buffer and re-inserted into the packet processing pipeline. The re-inserted packet may then be re-processed by the packet processing pipeline as before. It is possible to provide the original destination information for the re-inserted packet so that it need not be re-determined on re-processing. However, doing so may incur an undesirably large overhead that may not be as preferable as simply re-determining the destinations of the packet.

When the dropped packet is removed from the dropped packet buffer 306, the re-insertion timer 313 may be reset. If the dropped packet buffer 306 contains further dropped packets, the re-insertion timer may be restarted and the re-insertion process repeated until the dropped packet buffer 306 is cleared. The re-insertion timer 313 thereby enforces a minimum time interval between dropped packet re-insertions. The actual time period between re-insertions may be variable as a packet may not be re-inserted until the corresponding re-insertion request is granted. The minimum time interval may be configured dynamically based upon a current load of the dropped packet buffer 306.

Figure 3B:
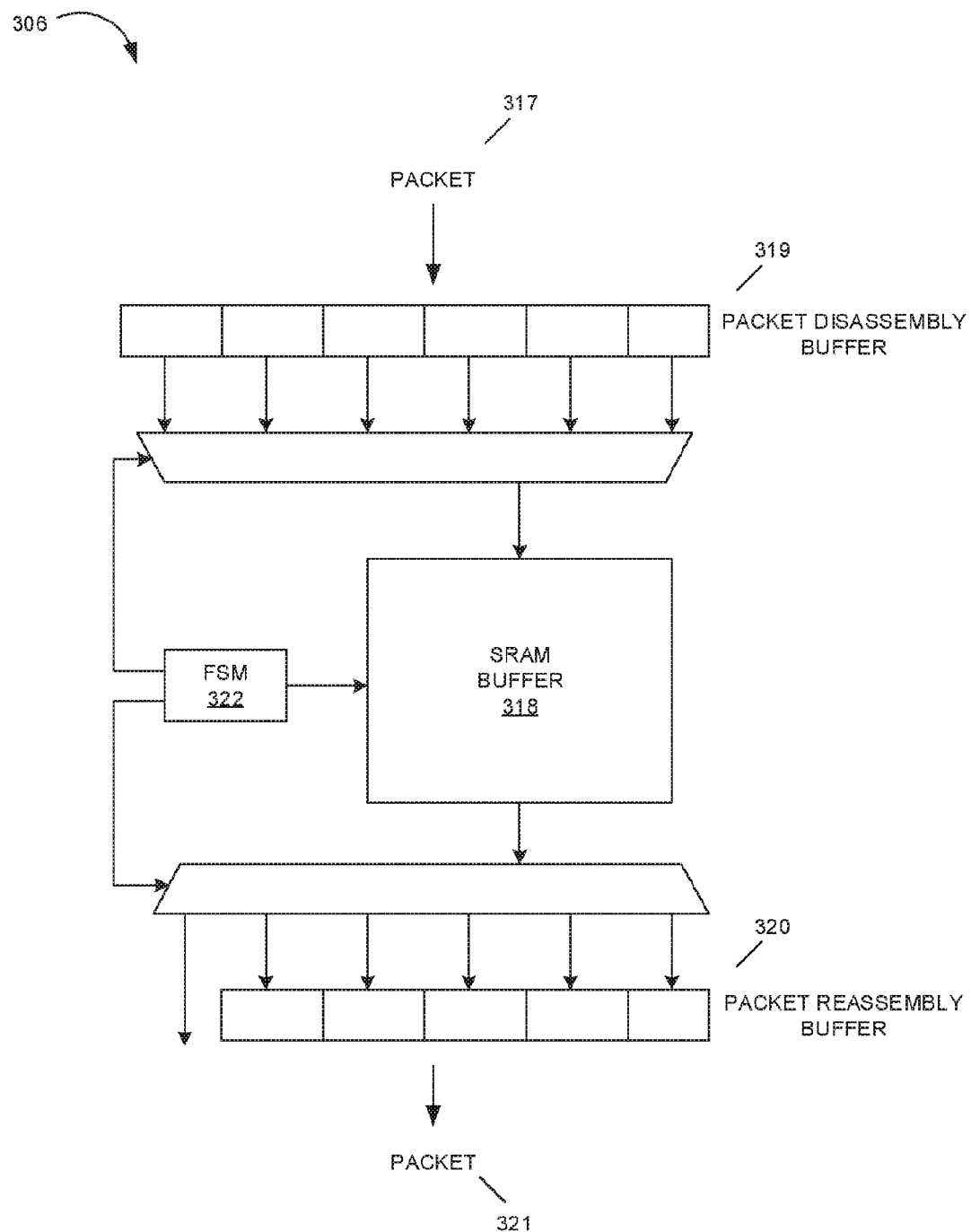
FIG. 3B is a schematic illustration of a dropped packet buffer.

Referring now to FIG. 3B, an exemplary implementation of the dropped packet buffer 306 will now be described. The dropped packet buffer 306 may comprise one or more SRAM modules and may be configured to store a plurality of dropped data packets. More specifically, dropped packets may be stored in an SRAM buffer 318. For example, the SRAM buffer 318 may be implemented using a single-ported SRAM macro with data packets ranging in size from 64 bits to 192 bits.

A packet 317 to be stored in the SRAM buffer 318 may first be written to a packet disassembly buffer 319. The packet disassembly buffer 319 may, for example, be implemented as six parallel 32-bit registers in order to enable the largest possible packet size to be written into the packet disassembly buffer 319 in one cycle. The packet may then be transferred into the SRAM buffer 318. This may take several cycles depending on the width of the input to the SRAM buffer 318. The timers 309, 310 for controlling when packets are to be dropped from the packet processing pipeline may be reset when a packet is copied to the packet disassembly buffer 319. Thus, the transfer of the packet to the SRAM buffer 318 may occur during the packet dropping timeout period. If the timeout period expires before the completion of the transfer of the packet to the SRAM buffer 318, another packet cannot be dropped until the transfer of the current packet to the SRAM buffer 318 is complete. If the destinations of the other packet become available during this additional waiting period, the packet may be transmitted out of the router 105 to its destination rather than becoming a dropped packet.

To facilitate the removal of a packet from the SRAM buffer 318, the dropped packet buffer 306 may further comprise a packet reassembly buffer 320 similar to the packet disassembly buffer 319. The packet reassembly buffer 320 may however comprise one fewer register as the final part of the packet may be directly transferred out of the SRAM buffer 318 in parallel with the rest of the packet data already transferred to the packet reassembly buffer 320 to reassemble the removed packet 321. The writing to/from the packet disassembly and reassembly buffers 319, 320 and the SRAM buffer 318 may be controlled according to a finite state machine (FSM) 322.

Should there be a possibility of overflow of the dropped packet buffer 306, a back-up software mechanism may be used to transfer packets in the dropped packet buffer 306 to memory elsewhere on chip for re-transmittal. This may involve sending an interrupt signal to a monitor processor when the dropped packet buffer 306 is approaching full and/or overflowing. For example, referring back to FIG. 3A, the packet re-insertion module 307 may further comprise a set of status registers 315 that provides monitoring or diagnostic data relating to the packet re-insertion module 307. This may include an SRAM word counter that indicates the present number of words stored in the SRAM buffer 318. A "full-point" value may be stored in a general register file 316 of the router 105. The general register file 316 comprises various control and configuration settings for the router 105 stored in the registers of the general register file 316.

A processing element on the chip may be designated as a monitor processor. The monitor processor may periodically poll the status registers 315 or an "approaching full" interrupt may be generated to alert the monitor processor when the SRAM word counter exceeds the "full-point" value. The monitor processor may then take appropriate action such as adjusting timer settings which may be configurable using the general register file 316 or to transfer packets out of the dropped packet buffer 306. If there is not enough available storage space in the dropped packet buffer 306 for storing a new dropped packet, an overflow interrupt may be transmitted to the monitor processor and the monitor processor may initiate removal of packets from the dropped packet buffer 306 through a software-based instruction.

In one example, in order to transfer a packet out of the dropped packet buffer 306, the monitor processor may initiate a read from an "offload header" register in the general register file 316. The reading of the "offload header" register may trigger a software packet offload request to be generated and sent to the packet re-insertion module 307. In response to the request, the packet re-insertion module 307 may be configured to transfer a packet from the dropped packet buffer 306 to registers in the general register file 316 with the packet's header information being returned to the monitor processor as a response to the "offload header" register read operation. The monitor processor may then interpret the header information and initiate a read and transfer of the remaining packet data held in the general register file 316 to another memory location outside of the router 105 for retransmission of the packet. For example, the packet may be transferred to the monitor processor's local memory.

In addition to the SRAM word counter to record the current capacity usage of the SRAM buffer 318, the status registers 315 may also include registers to record the count of the total number of reinserted packets (via the normal hardware based mechanism), a word water-level counter which records the maximum number of words that have been stored in the SRAM buffer 318 observed during a specified period of time, an equivalent packet water-level counter for the maximum number of packets rather than words and a recurrent dropped packet count which records the number of packets that have been dropped more than once. The recurrent dropped packet count may be monitored by setting a bit in the header of a packet indicating that the packet has been dropped. Such monitoring data may be useful for diagnostic and configuration purposes.

Figure 4:
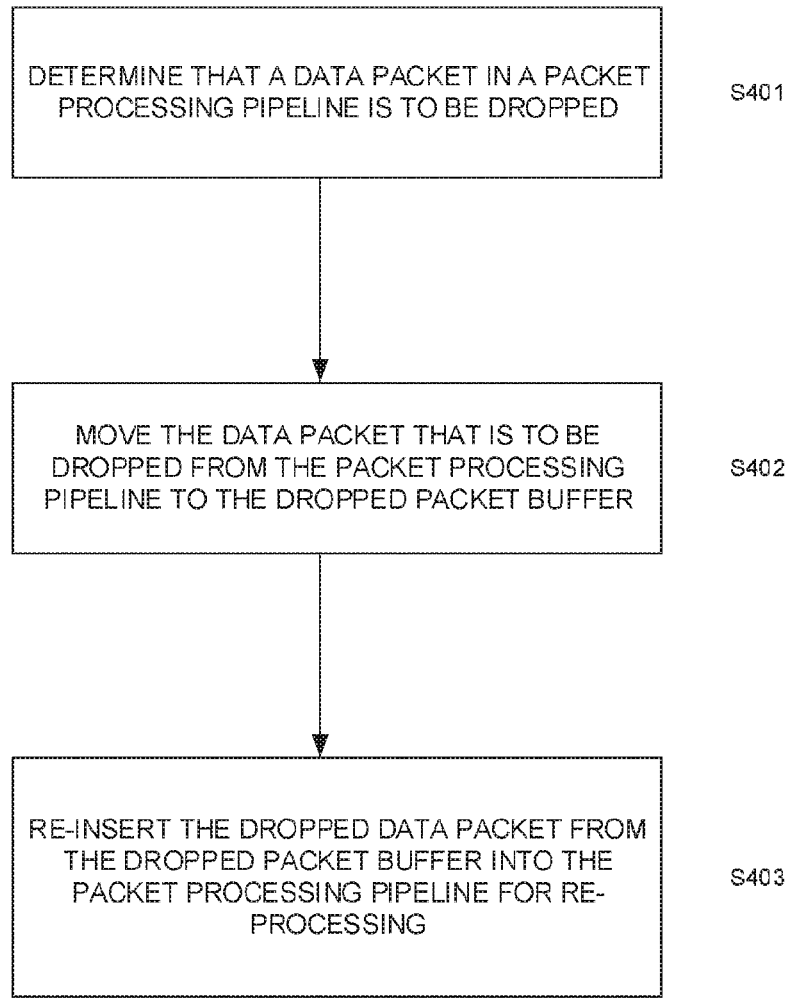
FIG. 4 is a flowchart showing processing carried out by the router.

Referring now to FIG. 4, processing for routing data on a neuromorphic chip is shown, in particular, a process for handling data packets that cannot be transmitted. It will be appreciated that the processing may be implemented by the router 105 of FIGS. 1, 2 and 3. FIG. 4 describes the processing a high-level whilst FIGS. 5 to 8 provide more detailed examples.

At step S401 of FIG. 4, one or more circuits of the router 105 determine that a data packet in the packet processing pipeline is to be dropped. At step S402, the data packet that is to be dropped is moved from the packet processing pipeline to the dropped packet buffer 306 using the one or more circuits. At step S403, the dropped data packet is re-inserted by the one or more circuits from the dropped packet buffer 306 into the packet processing pipeline for re-processing.

Figure 5:
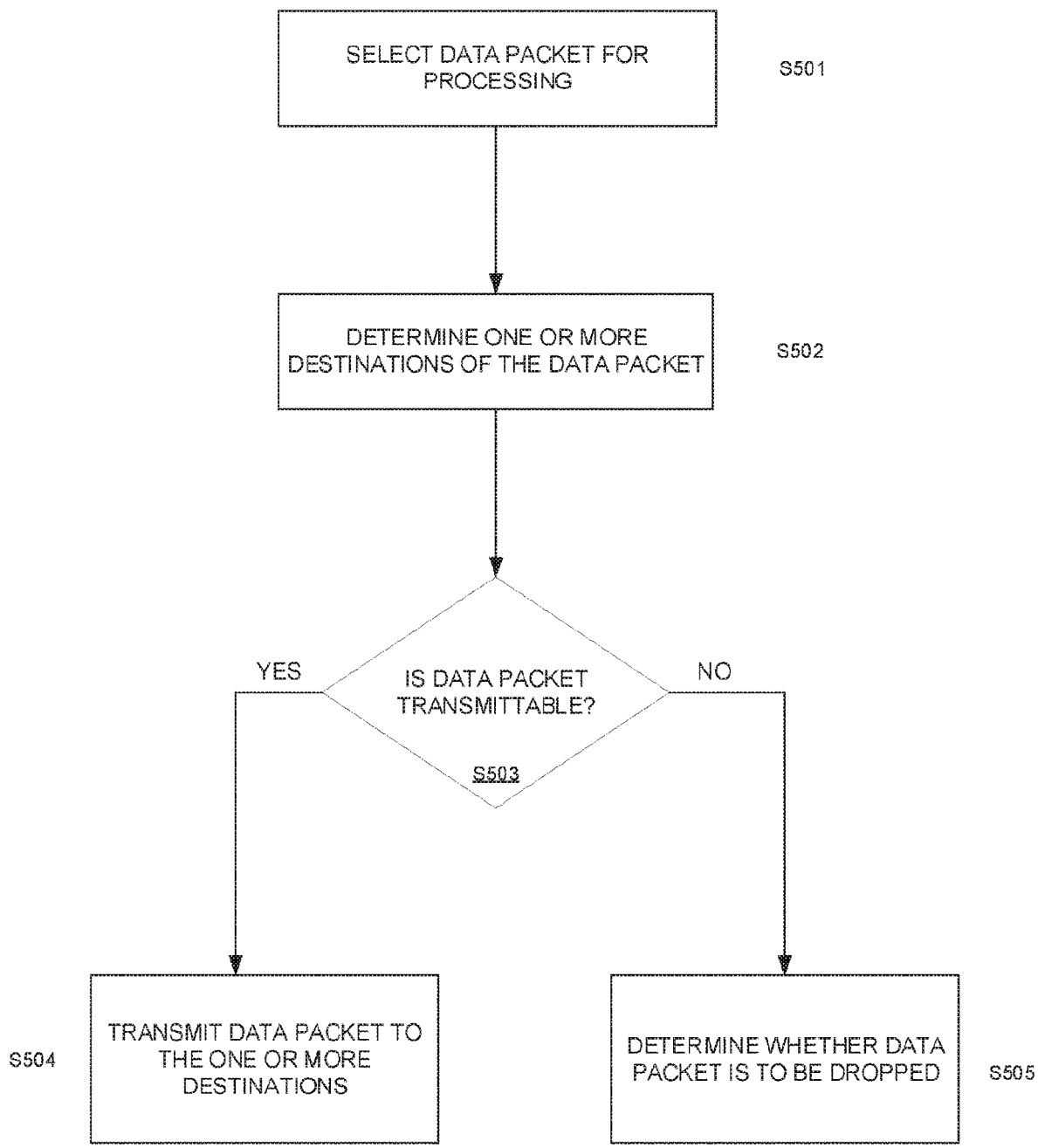
FIG. 5 is a flowchart showing processing carried out by the router in more detail.

Referring now to FIG. 5, exemplary processing of data packets in a packet processing pipeline will now be described in more detail. At step S501, a data packet is selected for processing. The data packet may be selected from a plurality of input data streams 301 as described above. Where there is only a single data stream, the data packet may be next data packet in an input queue.

At step S502, one or more destinations of the data packet are determined. This may be performed by a routing engine 303 and as described above, the one or more destinations may be determined based upon information contained within the data packet, such as a source identifier or destination identifier. The identifiers may be used to search an associative memory 308 to determine the one or more destinations and to determine an appropriate routing path.

At step S503, it is determined whether the data packet can be transmitted to the one or more destinations. As discussed above, the determination may be based upon a signal indicating that a destination of the data packet is unable to receive the data packet.

If the data packet can be transmitted, processing continues at step S504 where the data packet is transmitted to the one or more destinations. As noted above, the data packet may be transmitted via one or more output ports 304. If the data packet cannot be transmitted, processing continues at step S505 where it is determined whether the data packet is to be dropped.

Figure 6:
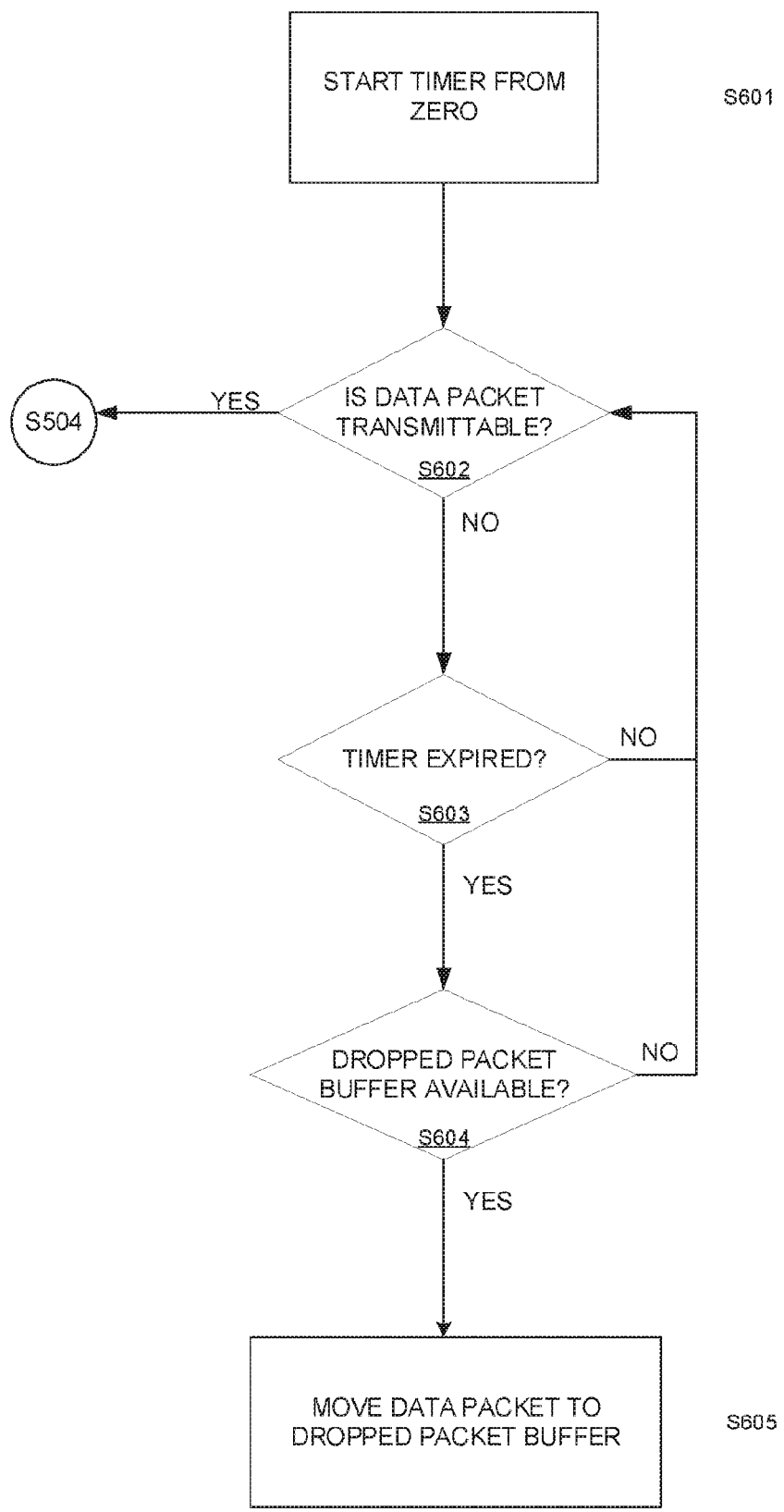
FIG. 6 is a flowchart showing exemplary processing for determining whether to drop a data packet.
Figure 7:
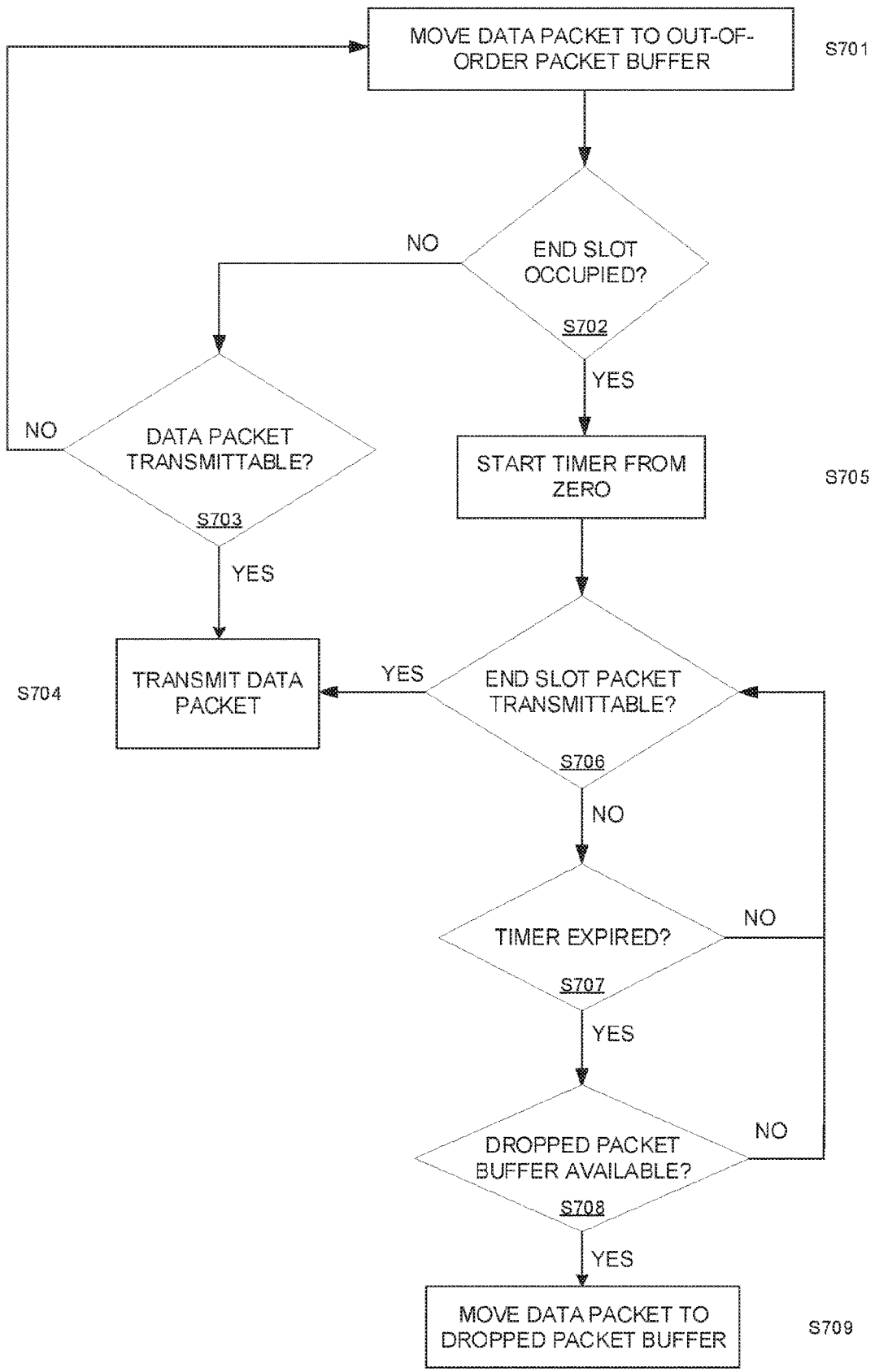
FIG. 7 is a flowchart showing alternative exemplary processing for determining whether to drop a data packet.

Two exemplary methods of determining whether to drop a data packet are shown in FIGS. 6 and 7 respectively. Referring firstly to FIG. 6, at step S601, a timer 309 is started from zero. This may occur in response to the determination that a data packet cannot be transmitted in step S505 of FIG. 5. Steps S602 and S603 form a loop in which processing waits until either the data packet can be transmitted or the timer 309 expires. If the data packet can be transmitted, processing returns to step S504 where the data packet is transmitted. If the timer 309 expires, processing continues at step S604 where it is firstly determined whether the dropped packet buffer 306 is available and if so, the data packet is moved to the dropped packet buffer 306 at step S605.

Otherwise, if the dropped packet buffer 306 is not available, processing returns to step S602 where it is determined if the data packet can be transmitted. Exemplary processing of the dropped packet is described in further detail below with reference to FIG. 8.

Referring now to FIG. 7, a second exemplary method of determining whether to drop a data packet will now be described. At step S701, the data packet is moved to an out-of-order packet buffer 305. This may be in response to the determination that the data packet cannot be transmitted in step S505. As discussed above, existing data packets in the out-of-order packet buffer 305 may be pushed along towards the end of the out-of-order packet buffer 305 to accommodate the new data packet.

At step S702, it is determined whether the end slot of the out-of-order packet buffer 305 is occupied. If the end slot is not occupied, the data packets in the out-of-order packet buffer 305 remain in a waiting state until either a data packet can be transmitted (step S703 and S704) or until the data packet reaches the end slot of the out-of-order packet buffer 305.

When the end slot of the out-of-order packet buffer 305 is occupied, a timer 310 is started from zero at step S705 which provides a final time interval during which the packet can be transmitted before it is determined that the data packet should be dropped as shown by the loop at steps S706 and S707. Should the data packet become transmittable during this time period, processing continues at step S704 where the data packet is transmitted. If instead the timer 310 expires, it is firstly determined at step S708 whether the dropped packet buffer 306 is available. If so, it is determined that the data packet in the end slot of the out-of-order packet buffer 305 should be dropped and the data packet is moved to the dropped packet buffer 306 at step S709. Exemplary processing of the dropped packet is described in further detail below with reference to FIG. 8. If the dropped packet buffer 306 is not available, processing returns to step S706 where it is determined whether the data packet at the end slot of out-of-order packet buffer 305 can be transmitted. It will be appreciated that should any packet in the out-of-order packet buffer 305 become transmittable during the processing of FIG. 7, that data packet may be transmitted at any time. Existing packets in the out-of-order packet buffer 305 may be moved forward to fill the slot left behind by the transmitted packet. However, in order to reduce power consumption, it is possible only to move packets to fill empty slots when there is a new packet to insert into the out-of-order packet buffer 305.

Figure 8:
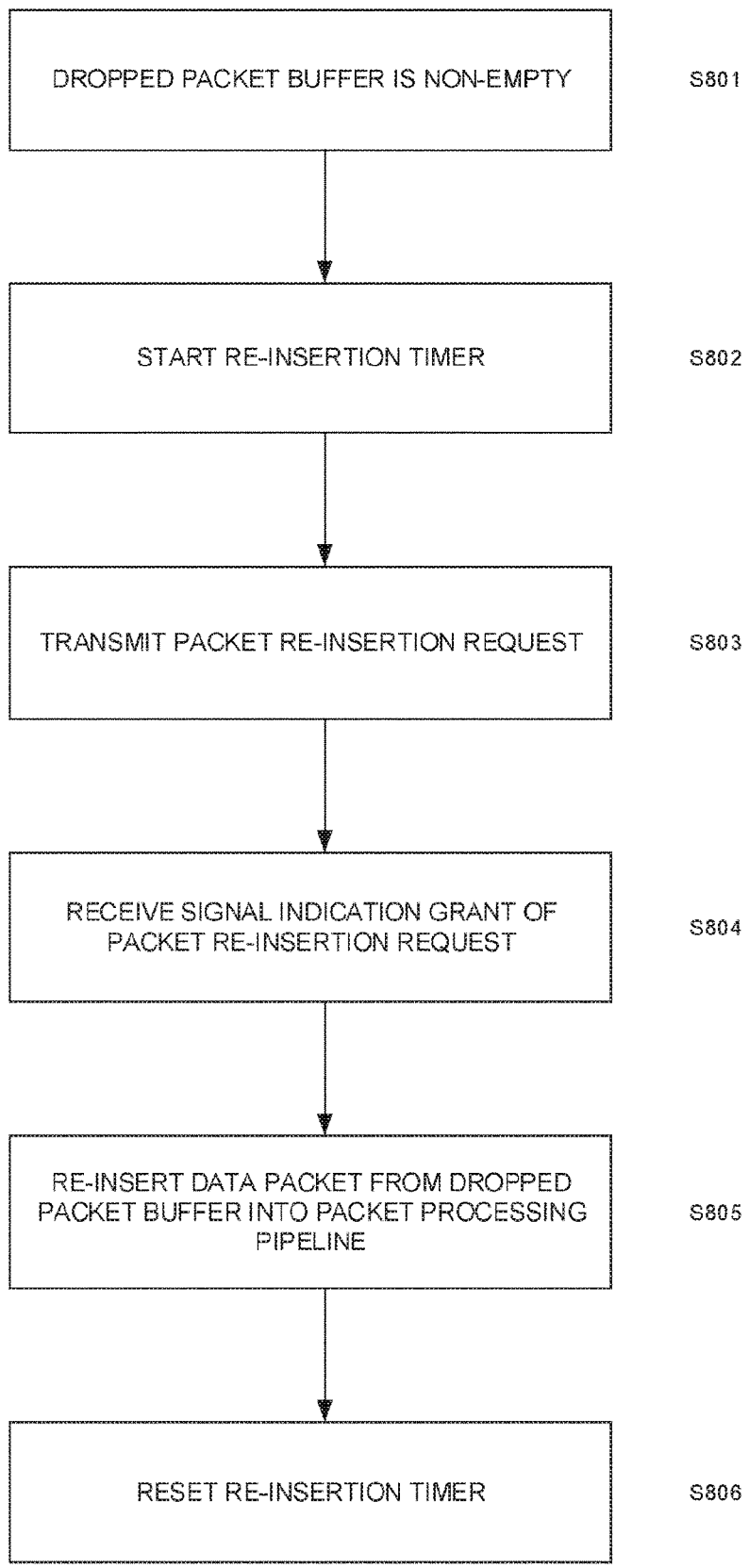
FIG. 8 is a flowchart showing processing for handling dropped data packets.

Referring now to FIG. 8, exemplary processing for handling dropped packets will now be described. It will be appreciated that the processing may be implemented by a packet reinsertion module 307 of the router 105. Processing begins at step S801 when the dropped packet buffer 306 becomes non-empty. In response, at step S802, a re-insertion timer 313 is started and processing waits for a specified time interval before continuing at step S803. At step S803, a packet re-insertion request is transmitted, for example from a re-insertion requester 314. At step S804, a signal indicating that the packet re-insertion request has been granted is received. As discussed above, the packet re-insertion request may be transmitted to the packet processing pipeline and be granted when the packet processing pipeline is able to process a re-inserted data packet.

Processing then continues at step S805, where a data packet from the dropped packet buffer 306 is re-inserted into the packet processing pipeline. As discussed above, the re-inserted data packet may be the oldest data packet in the dropped packet buffer 306. At step S806, the re-insertion timer 313 is reset. Processing may restart at step S801 in if the dropped packet buffer continues to be non-empty.

A comparative analysis of the throughput of an exemplary embodiment of the router will now be discussed. Reference signs in accordance with FIGS. 1 to 3B are provided in parentheses for clarity. The exemplary router (105) has a clock speed of 400 MHz and comprises a dropped packet buffer (306) implemented as a 2K×32-bit SRAM macro (SRAM buffer 318). This has the capacity to store 1K data packets without a payload and a maximum of 333 packets with a maximum 128-bit payload. The exemplary router (105) further comprises six output ports (304) serving 152 processing elements (101) and 7 inter-chip links (102). The 152 processing elements (101) are implemented using ARM Cortex M4F processors arranged as 38 Quad-core Processing Elements (201). The processors have a clock speed of 300 MHz. The on-chip network is implemented using a 2D mesh topology.

Comparisons have been performed against the SpiNNaker 1 neuromorphic chip (University of Manchester, United Kingdom). The router of the SpiNNaker 1 chip has a clock speed of 133 MHz and uses software-based packet re-insertion as described above. The SpiNNaker 1 chip has 18 ARM968 processor cores. Given the fewer number of processing elements, the on-chip network can be implemented as a star topology. In addition, there are six inter-chip links.

Turning now to the comparative analysis, the throughput of the SpiNNaker 1 router and the exemplary router (105) without packet re-insertion is compared. It is assumed that a processing element (101) takes an order of 30 cycles to process a packet from the network. This could however be much worse depending on processor load. It is noted that processing elements (101) of the exemplary embodiment implements packet DMA and therefore has a higher receiving rate than the processing elements of the SpiNNaker 1 chip. It will be understood that a worst-case throughput is determined based upon the slowest component in all possible communication paths.

Under conditions when all packets are being dropped, the SpiNNaker-1 router throughput is likely to be limited by the ability of the software packet re-insertion mechanism to keep up with the rate at which packets are being dropped (i.e. time required for the software to copy and process each dropped packet). This has been determined to be at a rate of 1 packet every 240 router clock cycles, which at a router clock frequency of 133 MHz leads to a throughput of 0.56 M packets/s.

The exemplary router can, due to its hardware mechanism, drop packets at a rate of one every 4 clock cycles, which with its 400 MHz clock leads to a packet throughput of 100 M packets/s, 180 times faster than the SpiNNaker-1 router. For an equivalent clock frequency, an improvement factor of 60 would be observed.

There are, of course, several other factors that may restrict the router throughput, including the inter-chip link bandwidth and the ability of the processor that is receiving a stream of packets to keep up with that stream, but the above estimates show that, whereas on SpiNNaker-1 the software packet re-insertion mechanism will usually be the throughput limiting factor in circumstances where congestion causes packets to be dropped, in the exemplary router the hardware mechanism ensures that this is very unlikely to be the case.

The above embodiments describe the present invention in the context of neuromorphic chips. It will be appreciated that the present invention is not limited neuromorphic chips and may be applied to any type of computing chip, in particular, "many-core" chips of the type used in high performance computing (HPC).

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The invention claimed is:

1. A router for routing data on a computing chip comprising a plurality of processing elements, the router comprising:
   a packet processing pipeline; and
   a hardware mechanism for packet dropping and re-insertion, fully within the router, the hardware mechanism comprising:
   a dropped packet buffer; and
   one or more circuits configured to:
      determine that a data packet in the packet processing pipeline is to be dropped;
      move the data packet that is to be dropped from the packet processing pipeline to the dropped packet buffer; and
      re-insert, with the one or more circuits within the router, the dropped data packet from the dropped packet buffer into the packet processing pipeline for re-processing.

2. The router of claim 1, wherein the one or more circuits are configured to determine that a data packet in the packet processing pipeline is to be dropped based upon a signal indicating that a destination of the data packet is unable to receive the data packet.

3. The router of claim 1, wherein the packet processing pipeline further comprises an out-of-order packet buffer and wherein the one or more circuits are configured to move the data packet that is to be dropped from the out-of-order packet buffer to the dropped packet buffer.

4. The router of claim 3, wherein the one or more circuits are further configured to:
   select a data packet for processing by the packet processing pipeline;
   determine one or more destinations of the data packet;
   determine that a destination of the one or more destinations of the data packet is unable to receive the data packet; and
   move the data packet to the out-of-order packet buffer.

5. The router of claim 3, wherein the data packet that is to be dropped is the oldest data packet in the out-of-order packet buffer.

6. The router of claim 1, wherein the one or more circuits are configured to determine that a data packet in the packet processing pipeline is to be dropped based upon the expiration of a timer.

7. The router of claim 1, wherein the one or more circuits are configured to re-insert the dropped data packet from the dropped packet buffer into the packet processing pipeline for re-processing based upon a timer.

8. The router of claim 1, wherein the one or more circuits are configured to re-insert the dropped data packet from the dropped packet buffer into the packet processing pipeline for re-processing based upon a load of the packet processing pipeline.

9. The router of claim 1, wherein the router is configured to provide a software-based packet offload operation to remove a data packet stored in the dropped packet buffer for re-processing of the data packet outside of the router.

10. The router of claim 1, wherein the packet processing pipeline is configured to process multi-cast data packets.

11. The router of claim 1, wherein the dropped packet buffer is configured to store a plurality of dropped data packets.

12. The router of claim 1, wherein the dropped packet buffer comprises one or more SRAM modules.

13. The router of claim 1, wherein the computing chip is a neuromorphic chip.

14. A method of routing data with a router on a computing chip comprising a plurality of processing elements, the router comprising a packet processing pipeline, a dropped packet buffer, and one or more circuits, the method comprising:
   determining, by the one or circuits of the router, that a data packet in the packet processing pipeline is to be dropped;
   moving, by the one or more circuits of the router, the data packet that is to be dropped from the packet processing pipeline to the dropped packet buffer within the router; and
   re-inserting, by the one or more circuits of the router, the dropped data packet from the dropped packet buffer into the packet processing pipeline for re-processing without transmission of the dropped packet to a monitor processor and re-transmission to the router.

15. The method of claim 14, wherein determining that a data packet in the packet processing pipeline is to be dropped is based upon a signal indicating that a destination of the data packet is unable to receive the data packet.

16. The method of claim 14, further comprising moving the data packet that is to be dropped from an out-of-order packet buffer to the dropped packet buffer.

17. The method of claim 16, further comprising:
   selecting a data packet for processing by the packet processing pipeline;
   determining one or more destinations of the data packet;
   determining that a destination of the one or more destinations of the data packet is unable to receive the data packet; and
   moving the data packet to the out-of-order packet buffer.

18. The method of claim 16, wherein the data packet that is to be dropped is the oldest data packet in the out-of-order packet buffer.

19. The method of claim 14, wherein determining that a data packet in the packet processing pipeline is to be dropped is based upon the expiration of a timer.

20. The method of claim 14, wherein re-inserting the dropped data packet from the dropped packet buffer into the packet processing pipeline for re-processing is based upon a load of the packet processing pipeline.

21. The method of claim 14, further comprising removing a data packet stored in the dropped packet buffer in response to a software-based packet offload operation.

22. The method of claim 14, wherein the packet processing pipeline is configured to process multi-cast data packets.

23. The method of claim 14, wherein the dropped packet buffer is configured to store a plurality of dropped data packets.

24. The method of claim 14, wherein the dropped packet buffer comprises one or more SRAM modules.

25. The method of claim 14, wherein the computing chip is a neuromorphic chip.

\* \* \* \* \*